United States Patent
Janssen

(10) Patent No.: US 9,424,499 B2
(45) Date of Patent: Aug. 23, 2016

(54) METHOD FOR PRINTING A GRAYSCALE RASTER IMAGE BY GRAYSCALE VALUE DISPERSION

(71) Applicant: Océ-Technologies B.V., Venlo (NL)

(72) Inventor: Johannes H.M. Janssen, Venlo (NL)

(73) Assignee: OCE-TECHNOLOGIES B.V., Venlo (NL)

(*) Notice: Subject to any disclaimer, the term of this patent is extended or adjusted under 35 U.S.C. 154(b) by 0 days.

(21) Appl. No.: 14/790,477

(22) Filed: Jul. 2, 2015

(65) Prior Publication Data

US 2016/0012323 A1    Jan. 14, 2016

(30) Foreign Application Priority Data

Jul. 11, 2014   (EP) .................................. 14176791

(51) Int. Cl.
| | | |
|---|---|---|
| H04N 1/405 | (2006.01) | |
| H04N 1/409 | (2006.01) | |
| G06K 15/02 | (2006.01) | |
| G06T 5/00 | (2006.01) | |
| G06T 5/30 | (2006.01) | |
| H04N 1/32 | (2006.01) | |

(52) U.S. Cl.
CPC ........ G06K 15/1881 (2013.01); G06K 15/1872 (2013.01); G06K 15/1878 (2013.01); G06T 5/002 (2013.01); G06T 5/003 (2013.01); G06T 5/30 (2013.01); H04N 1/32149 (2013.01); H04N 1/409 (2013.01); H04N 1/4051 (2013.01)

(58) Field of Classification Search
None
See application file for complete search history.

(56) References Cited

U.S. PATENT DOCUMENTS

| | | | | |
|---|---|---|---|---|
| 5,363,210 A | * | 11/1994 | Sasaki | ................. H04N 1/4053 358/3.15 |
| 5,408,338 A | | 4/1995 | Koike | |
| 5,701,366 A | * | 12/1997 | Ostromoukhov | .... H04N 1/4058 358/1.9 |
| 6,246,419 B1 | | 6/2001 | Loce et al. | |
| 6,275,304 B1 | | 8/2001 | Eschbach et al. | |
| 6,504,949 B2 | * | 1/2003 | Matsukubo | ............ G06K 15/02 382/266 |
| 6,606,420 B1 | | 8/2003 | Loce et al. | |
| 7,099,520 B2 | * | 8/2006 | Ishiguro | ................ G06T 7/0083 382/260 |
| 7,430,342 B2 | * | 9/2008 | Nabeshima | ............. G06T 3/403 345/3.3 |
| 8,373,775 B2 | * | 2/2013 | Higuchi | .................. G06T 5/002 348/222.1 |
| 2012/0020570 A1 | | 1/2012 | Yao et al. | |
| 2014/0168665 A1 | * | 6/2014 | Kaneda | ............. G03G 15/5025 358/1.1 |
| 2015/0371122 A1 | * | 12/2015 | Nakamura | ......... G06K 15/1873 358/2.1 |

FOREIGN PATENT DOCUMENTS

EP    1 988 490 A1   11/2008

* cited by examiner

*Primary Examiner* — Scott A Rogers
(74) *Attorney, Agent, or Firm* — Birch, Stewart, Kolasch & Birch, LLP

(57) ABSTRACT

A method is provided for enhancing a grayscale raster image comprising pixels. The method comprises the steps of composing a second raster image of equal dimensions to said raster image, selecting a target pixel in the second raster image, having a target position, and deriving a grayscale value for the target pixel from a grayscale value of a pixel in said raster image that is in a neighborhood of a pixel on a position corresponding to the target position, thereby dispersing the gray value of a pixel in a predetermined range around its original position and working the second raster image up for a halftoning process without using pixel segmentation.

8 Claims, 2 Drawing Sheets

| 50 | 50 | 50 | 50 | | 150 | 150 | 150 | 150 |
|----|----|----|----|----|-----|-----|-----|-----|
| 50 | 50 | 50 | 50 | | 150 | 150 | 150 | 150 |
| 50 | 50 | 50 | 50 | | 150 | 150 | 150 | 150 |
| 50 | 50 | 50 | 50 | 1 | 150 | 150 | 150 | 150 | 2 |
| 50 | 50 | 50 | 50 | | 150 | 150 | 150 | 150 |
| 50 | 50 | 50 | 50 | | 150 | 150 | 150 | 150 |
| 50 | 50 | 50 | 50 | | 150 | 150 | 150 | 150 |
| 50 | 50 | 50 | 50 | | 150 | 150 | 150 | 150 |

4 — (1) 17 41 73 84 124 164 204
9 33 65 105 116 156 196 228
25 57 97 137 148 188 220 244
49 89 129 169 180 212 236 252
81 121 161 201 (8) 24 48 80   4
113 153 193 225 16 40 72 112
145 185 217 241 32 64 104 144
177 209 233 249 56 96 136 176   ← 3
4 — (5) 21 45 77 88 128 168 208
13 37 69 109 120 160 200 232
29 61 101 141 152 192 224 248
53 93 133 173 184 216 240 255
85 125 165 205 (4) 20 44 76
117 157 197 229 12 36 68 108   4
149 189 221 245 28 60 100 140
181 213 237 253 52 92 132 172

| 0 | 50 | 0 | 0 |
| 0 | 50 | 0 | 0 |
| 0 | 50 | 0 | 0 |
| 0 | 50 | 0 | 0 |
| 0 | 50 | 0 | 0 |
| 0 | 50 | 0 | 0 |
| 0 | 50 | 0 | 0 |
| 0 | 50 | 0 | 0 |

← 9

| 0 | 0 | 0 | 0 |
| 0 | 0 | 0 | 50 |
| 0 | 0 | 50 | 50 |
| 0 | 50 | 50 | 0 |
| 50 | 50 | 0 | 0 |
| 50 | 0 | 0 | 0 |
| 0 | 0 | 0 | 0 |
| 0 | 0 | 0 | 0 |

← 10

| 0 | 50 | 0 | 0 |
| 0 | 0 | 50 | 0 |
| 0 | 50 | 0 | 0 |
| 50 | 0 | 0 | 0 |
| 0 | 0 | 50 | 0 |
| 0 | 0 | 0 | 50 |
| 0 | 50 | 0 | 0 |
| 50 | 0 | 0 | 0 |

← 11

| 0 | 0 | 0 | 0 |
| 0 | 0 | 50 | 50 |
| 0 | 0 | 0 | 50 |
| 0 | 0 | 50 | 0 |
| 50 | 0 | 0 | 50 |
| 0 | 50 | 0 | 0 |
| 50 | 0 | 0 | 0 |
| 0 | 0 | 0 | 0 |

← 12

METHOD FOR PRINTING A GRAYSCALE RASTER IMAGE BY GRAYSCALE VALUE DISPERSION

BACKGROND OF THE INVENTION

1. Field of the Invention

The present invention relates to methods for enhancing a raster image that comprises pixels, a pixel having a position in the raster image and a grayscale value. The invention further relates to print systems that comprise a print controller, an image processing module, and a print engine for receiving print jobs and marking image receiving material in accordance with a print job.

2. Description of the Related Art

A number of known print processes have been derived from digital copying processes, which in turn have had analog copying predecessors. Electrophotographic print processes are a familiar example of these. The development of toner in the form of powder on an electrophotographic image carrier is tuned to rendering details that occur in the copying processes, which comprise a step of optical image capturing. The resolution of the involved images is commonly in the order of several pixels, especially since pixels have become as small as $\frac{1}{600}$ of an inch and smaller.

In contrast, print processes apply image data having a digital origin and these image data may therefore be defined with a resolution of a single pixel, however small the pixel may be. As a result, without further measures, some print processes do not reproduce lines and other graphic elements, including characters, well, if the elements have a dimension smaller than a critical value. This may be solved by introducing a minimum line width in the Page Description Language (PDL) interpreter, such that all line elements having a line width smaller than the critical value are drawn by the Raster Image Processor (RIP) using a fixed minimum line width. In U.S. Pat. No. 6,246,419, a similar approach is presented in a method for manipulating the line width of a PDL defined graphic in dependence on marking characteristics of a desired output printer.

However, as a result, lines with various widths are printed with the same line width, which makes them indiscernible. Furthermore, image data currently often comprise color information, which, when rendered on a monochrome printer, is mapped to a grayscale. Hence, different colors are to be discerned by their gray value. In particular, the discernible, faithful rendering of thin colored lines, as frequently used in computer-aided design (CAD), may prove to be difficult on a monochrome printer.

A known factor in limiting the resolution of the print processes is the halftone image processing module that converts a grayscale image into a binary image, in which every pixel takes one of two possible values. Depending on the image forming process in a printer, either a matrix dithering module or an error diffusion module is applied or some combination of these, which results in characteristic halftone patterns, that are suitable to be rendered by the printer. In particular, if the halftone patterns involve a number of fixed screen points, the distance between these screen points, as measured in pixel units, is of great importance for the print resolution. A screen point is a position in a halftoned image, where, for light gray values, a dark dot is developed with a light surrounding, which, in average, represents the light gray value. For dark gray values, a larger dark dot is developed at the screen point at the expense of the light surrounding, thereby making the average darker. These screen points are often regularly distributed over the image area. There is, in general, a balance between rendering gray areas, which benefit from a large distance between the screen points, and rendering details, which benefit from a short distance between the screen points. Gray, single-pixel lines are rendered with regular interruptions when their position and orientation makes them pass between the screen points. Light gray values lead to larger interruptions and dark gray values lead to smaller interruptions, depending on the distribution of the screen points. Thin lines having a width of several pixels suffer less from these interruptions In fact, these problems occur similarly in color separations for rendering a full color image.

These known problems in rendering details and other small image elements have provoked solutions based on identification of small image features, Such a solution is presented in U.S. Pat. No. 6,275,304, wherein small image features are identified by a combination of one or more of size, shape, color, and intensity attributes. The identification leads to a segmentation of image elements that are processed in dependence on the segmentation value, either by the halftoning module or by a module for enhancing the small image features. However, the step of segmentation has a disadvantage of causing an additional step in the image processing sequence and, more importantly, involves a risk of switching between two segmentation values for features on a boundary of a segmentation criterion. This may cause a deterioration of the print quality.

Therefore, a problem exists for working up a raster image for a halftoning process without using pixel segmentation in order to render thin lines and other small image elements satisfactorily. An object of the present invention is to provide a method that solves the above-mentioned shortcomings.

SUMMARY OF THE INVENTION

According to the present invention, a method is provided for enhancing a raster image that comprises pixels, a pixel having a position in the raster image and a grayscale value, the method comprising the steps of : a) defining a second raster image of equal dimensions to said raster image; b) selecting a target pixel in the second raster image, having a target position; c) deriving a grayscale value for the target pixel from a grayscale value of a pixel in said raster image that is in a neighborhood of a pixel on a position corresponding to the target position, thereby dispersing the grayscale value of a pixel in a predetermined range around its original position and working the second raster image up for a halftoning process without using pixel segmentation. By dispersing the gray value of a pixel around its original position, the chance that an arbitrary pixel of a thin line hits upon a screen point is enhanced relative to the situation without this dispersion. Besides, the interruptions of a rendered thin line are less regular, due to the dispersion, such that the interruptions become less conspicuous. It will look like as if the pixels that are not developed are part of the light surrounding that goes with a gray value. This method may be executed without segmentation, because for pixels in a gray area the dispersion will have little effect, since the pixels around an individual pixel have a similar pixel value. For pixels in a line, the dispersion will have the effect, that some pixels around the line will obtain a gray value as if they belong to the line. The line might become broader, if not the subsequent halftoning module would temper this effect by its screen points position. Thus, all pixels may be processed in the same way and no segmentation is necessary.

In a further embodiment, a high-pass filter is applied to enhance a contrast before dispersing a gray value. A high-pass filter is known to enhance a contrast of edges, including those of (thin) lines. After dispersion, the pixels with enhanced contrast are scattered around their initial position, thus contributing to the visibility of the line.

In a further embodiment, a morphological operation is applied in addition to dispersing a pixel value. A morphological operation, such as dilation and erosion, is defined to give a pixel in the center of a structuring element, such as a diamond, a circle or a square, a minimum or maximum value of the pixels within the structuring element. Thus, a broader or narrower line is obtained before dispersing the pixel values over a wider area. The selection of an appropriate morphological operation depends on the halftoning method that is used.

Further details of the invention are given in the claims. The present invention may also be embodied in a print system comprising a print controller for receiving and converting print jobs into raster images, a print engine for marking image receiving material according to a binary image and an image processing module configured to process a grayscale raster image according to one of the methods described above and and to process the resulting grayscale raster image into a binary image according to a halftoning method.

The scope of applicability of the present invention will become apparent from the detailed description given hereinafter. However, it should he understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS

Figure 1:
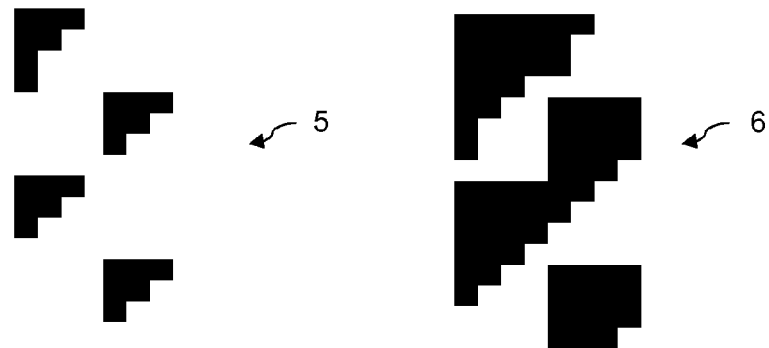
FIG. 1 shows a known conversion of gray areas in a raster image into halftone patterns.

The present invention will now be described with reference to the accompanying drawings, wherein the same or similar elements are identified with the same reference numeral.

In FIG. 1 two tables of 8×4 pixel values are shown which are representative for pixels in a uniform image area. Table 1 represents pixels in a light gray area and table 2 represents pixels in a dark gray area. In this figure, a grayscale from 0 to 255 is used, wherein 0 represents white and 255 represents black. In many imaging systems, the opposite is used and a conversion between the two is readily available. Table 3 in this figure is a part of a matrix with dither levels which is used in a halftoning process to convert a grayscale image into a binary image, wherein only the values white and black are used. A binary image is suitable for a print engine that either or not applies a fixed amount of colorant on a pixel position. A familiar halftoning process yields a black pixel if a grayscale pixel value is equal to or larger than a dither level on a corresponding position. Otherwise the pixel is white. The matrix is repeated to fill a complete image with dither levels. The matrix positions 4 are the screen points of the matrix, indicating positions where a first pixel is converted to black when a gray level increases. The various screen points have a slightly different dither level to enlarge the number of gray tones that lead to a distinguishable halftone patterns. Halftone pattern 5 is the result of this process for the image of table 1 and halftone pattern 6 comes from the image of table 2. Both patterns comprise 8×4 pixels. In many printing systems the size of a pixel is 1/600×1/600 inch, which means that the halftone patterns in this figure have a screen frequency of 106 lines per inch (lpi). This screen limits the resolution of the image rendering. Resolution is used here to indicate a minimum characteristic size of an image element that is rendered reliably. In contrast, an image may be defined by single pixels, which is referred to as the definition of the printing system. In this case the definition is much smaller than the resolution.

Figures 2, 3, 4:
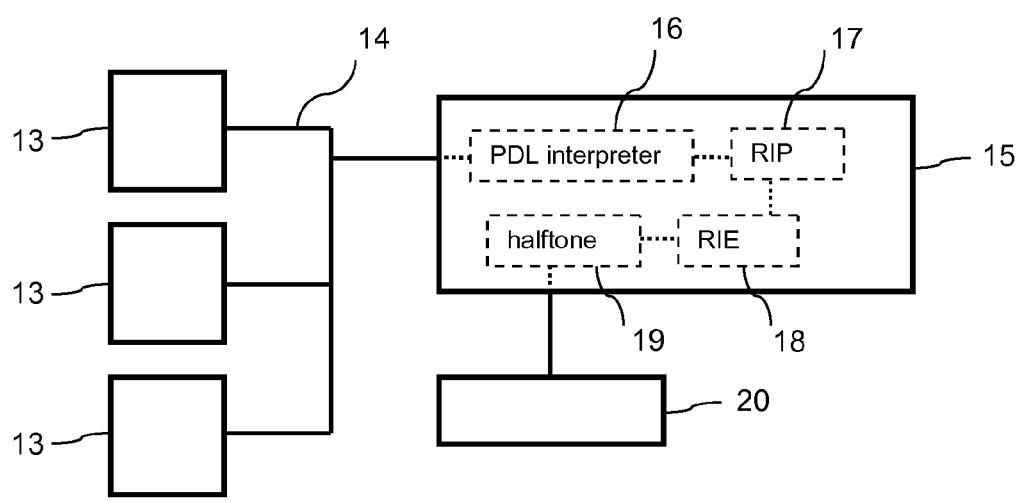
FIG. 2 shows a representation of thin, gray lines in a raster image.
FIG. 3 shows a result of enhancing a raster image according to the present invention.
FIG. 4 shows a print system wherein the present invention is used.

FIG. 2 shows two tables of 8×4 pixel values that represent two images of a thin line. Table 9 represents a vertical single pixel line and table 10 represents a thin line under 45 degrees. Both lines have a light gray value. If rendered by the halftoning process as described in FIG. 1, these lines will not be reliably converted into a halftone pattern. In fact, their rendering depends on the exact position relative to the screen points 4. By comparing the lines with the halftone pattern 5, it is apparent that the rendering of the single pixel line 9 depends on the column in which the pixel line occurs. In extreme cases, for this gray value for one vertical line out of four single pixel lines, not a single pixel in the halftoned line will be black. In such cases, the single pixel line becomes invisible in the halftoned raster image. The same applies for the thin line 10, which may pass the blocks of black pixels shown in pattern 5, but the halftoned line may also hit upon a series of screen points, thus having a large number of pixels turned black.

According to the present invention, the rendering of the thin lines is improved by dispersing the gray values around their original position, as shown in FIG. 3. Table 11 shows the pixel values for a vertical single pixel line as in Table 9 after the execution of a method according to the present invention and Table 12 shows the result after processing the thin line in Table 10. Although the definition of the lines seems to deteriorate, the reliability of the printing of the lines after halftoning improves. This is due to the fact that the pixels of a thin line are scattered around their original position and some of these pixels approach the screen points of the halftone pattern. At the same time, dispersing pixel values within a gray area does not change the distribution of pixel values. Several embodiments of the method have been developed which result in applicable raster images. The embodiments are presented in MATLAB, a common high-level programming language.

Embodiment 1

A first embodiment comprises the dispersion of pixels by a spatial jitter signal. No further enhancement is performed. In MATLAB code, this looks like:

```
%% parameters
NW=3; % jitter width
%% read image
X=imread('input_image.tif');
[h,b]=size(X);
Y=uint8(zeros(h,b));
%% process image
for x=1:b
    for y=1:h
        px=x+round(NW*(rand-0.5));
```

```
        py=y+round(NW*(rand-0.5));
        if px<1 px=1; end
        if px>b px=b; end.
        if py<1 py=1; end
        if py>h py=h; end
        Y(y,x)=X(py,px);
    end
end
%% write image
imwrite(Y, 'output_image.tif' , 'Resolution',600);
```

As can be seen, pixel values are dispersed both in a horizontal and in a vertical direction over a distance that is randomly selected up to a predetermined limit, in this code indicated by parameter NW. The procedure is the same for all pixels and no segmentation of pixels is used.

Embodiment 2

In a second embodiment, a high-pass filter (HPF) is applied to the original image, before dispersing the pixel values. An HPF enhances the edges, depending on a gain factor, thereby making the pixel values of thin lines a little darker gray. After dispersion, the darker pixels mark the path of the thin line. A dark gray pixel, arbitrarily positioned in the image, has a larger chance of being converted to a black dot in the halftone raster image, compared to a light gray pixel.

```
%% parameters
gn=0.2; % gain hpf;
NW=3; % jitter width
%% read image
X=imread('input_image.tif');
[h,b]=size(X);
Y=uint8(zeros(h,b));
%% process image
% HPF
%                0 -1  0
% pix_out = ( 1 + gn * -1  4 -1 ) * pix_in
%                0 -1  0
Kernel=[0 -1 0; -1 4 -1;0 -1 0];
XD=double(X);
X=uint8(gn*imfilter(XD,Kernel)+ XD); % HPF
clear XD;
for x=1:b
    for y=1:h
        px=x+round(NW*(rand-0.5));
        py=y+round(NW*(rand-0.5));
        if px<1 px=1; end
        if px>b pz=b; end
        if py<1 py=1; end
        if py>h py=h; end
        Y(y,x)=X(py,px);
    end
end
%% write image
imwrite(Y,'output_image.tif','Resolution',600);
```

The kernel of the HPF extends over 3 pixels. Alternatively, larger kernels may also be applicable, depending among others on the size of the pixels, which is in this case 1/600 inch in both directions.

Embodiment 3

In another embodiment, the amount of dispersion is made dependent on the gray level of the pixel. The light gray pixels are dispersed further than the dark gray pixels. Two thresholds are used to make the distinction between different gray values. The following code has been written for images that have 0 representing black and 255 representing white. The morphological dilation operation assigns a local minimum to a set of pixels within a structuring element, in this case a diamond.

```
%% parameters
gn=0.2;         % gain hpf;
radius=2;       % radius of the applied dilation
                % with level detection
NW=2;           % jitter width Mid Grays
NW2=3;          % jitter width Light Grays
threshold=40;   % below this threshold no jitter
threshold2=80;  % above this threshold max jitter
%% read image
X=imread('input_image.tif');
[h,b]=size(X);
Y=uint8(zeros(h,b));
%% process image
Kernel=[0 -1 0; -1 4 -1;0 -1 0];
XD=double(X);
X=uint8(gn*imfilter(XD,Kernel)+ XD);   % HPF
clear XD;
% Reduce spikes
Z=imfilter(X,fspecial('average',[2 2]));   % LPF
% dilation
se=strel('diamond', radius);
Z=imerode(Z,se);   % Note: as black=0 "imerode"
                   % does the dilation !
for x=1:b
    for y=1:h
        if Z(y,x) <= threshold
            px=x; py=y;
        elseif Z(y,x) <= threshold2
            px=x+round(NW*(rand-0.5));
            py=y+round(NW*(rand-0.5));
            if px<1 px=1; end
            if px>b px=b; end
            if py<1 py=1; end
            if py>h py=h; end
        else
            px=x+round(NW2*(rand-0.5));
            py=y+round(NW2*(rand-0.5));
            if px<1 px=1; end
            if px>b px=b; end
            if py<1 py=1; end
            if py>h py=h; end
        end
        Y(y,x)=X(py,px);
    end
end
%% write image
imwrite(Y,'output_image.tif','Resolution',600);
```

Although thin lines are rendered reliably, lines may show some granularity after application of this method. However, both with a 106 lpi screen and a 141 lpi screen, appropriate parameters have been found which improve the print quality, compared to omitting this method.

Embodiment 4

Another embodiment comprises the application of a low-pass filter (LPF) in combination with a high-pass filter (HPF). These filters are adjusted to have little effect on uniform areas, because the linear filters compensate each other. On edges however, a non-linear effect occurs, due to clipping of the pixel values, resulting in a dispersion of the pixel values around the edges.

```
%% parameters
gnH=0.51; % gain HPF
gnL=0.68; % gain LPF
%% read image
X=imread('input_image.tif');
%% process image
% step 1: HPF
%                    -0.25 -0.5 -0.25
% pix_out=(1+gnH *   -0.5   3   -0.5  )*pix_in
%                    -0.25 -0.5 -0.25
XD=double(X);
Kernel=[-0.25 -0.5 -0.25; -0.5 3 -0.5;-0.25 -0.5 -0.25];
Y=uint8(gnH*imfilter(XD,Kernel)+ XD);          % HPF
```

```
clear XD; imwrite(Y,'intermediate_image.tif');
% step 2: LPF
%                       0.25 0.5 0.25
% pix_out=((1-gnL)+gnL*0.25*    0.5  1   0.5  )* pix_in
%                       0.25 0.5 0.25
YD=double(Y);
Kernel=[0.25 0.5 0.25; 0.5 1 0.5; 0.25 0.5 0.25];
Z=uint8(gnL*0.25*imfilter(YD,Kernel)+ (1-gnL)*YD); % LPF
clear YD;
%% write processed image
imwrite(z,'processed_image.tif','Resolution',600);
```

Thus, a cascade of two opposing linear filters may be used to disperse pixel values without segmentation of pixels.

Embodiment 5

Dispersing pixels around their original position may also be done by dilating the image. Without further precautions, not only all thin elements will become thicker, but also light information between dark pixels may disappear. Therefore, the dilation is made dependent on the gray level, such that dispersed pixels occur more frequently for light gray pixels.

```
%% parameters
radius=1;        % radius dilate operation
mxdilate=160;    % for darker grays the dilatation
                 % becomes reduced
gndilate=0.5;    % gain dilate contribution
%% read image
X=imread('input_image.tif');
%% process image
% step 1: dilate
se=strel('diamond', radius);
Y=imerode(X,se);   % ='dilate' as black is '0'
imwrite(Y, 'intermediate_dilate1.tif');
% step 2: make dilation level dependent
YLD= max( Y, (2*mxdilate-Y) );
imwrite(YLD,'intermediate_dilate2.tif');
% step 3 reduce dilation contribution
YLD=255-gndilate*(255-YLD);
% step 4 add dilation to the input signal
OUT=min(YLD,X);    % OUT= the darkest of the two
%% write file
imwrite(OUT,'output_image.tif','Resolution',600);
```

This embodiment results in a similar improvement of print quality as previous embodiments, but its execution proved to be much faster.

Embodiment 6

A final embodiment combines the several elements of previous embodiments to tune the method on various aspects of thin elements. A level dependent dilation is combined with a set of opposing linear filters.

```
%% parameter input
gnHPF=0.5;       % 'preemphasis' weak lines
maxdilate=128;   % darkest dilate
gain=0.4;        % dilate contribution
%% constants
kw=2;            % kernel width average filter
radius=1;        % radius dilate operation
%% read image
X=imread('input_image.tif');
%% process image
% HPF
%                 0 -1  0
% pix_out = ( 1 + gn * -1  4 -1 ) * pix_in
%                 0 -1  0
Kernel=[0 -1 0; -1 4 -1; 0 -1 0];
XD=double(X);
Y=uint8(gnHPF*imfilter(XD,Kernel)+ XD); % HPF
clear XD;
```

```
% AVG
Z=imfilter(Y,fspecial('average',[kw kw]));
clear Y;
% Dilate
se=strel('diamond', radius);
ZD=imerode(Z,se); % = Dilate as 'white'=255 !
% make dilation level dependent
ZDD= max( ZD, (2*maxdilate-ZD) );
clear ZD;
% select darkest
ZLD=min(ZDD,Z);
clear ZDD Z;
% gain line enhancement
OUT=gain*ZLD+(1-gain)*X;
clear ZLD;
%% writing file
imwrite(OUT,'output_image.tif','Resolution',600);
```

Only three parameters are used to adapt this algorithm to a perceived print quality, that focuses not only on thin lines, but also on small characters.

The present invention is embodied in a print system as shown in FIG. 4. The work stations 13, which comprise personal computers, tablets and mobile devices, are configured to submit a print job to the print controller 15 by means of the connection 14, that comprises a local area network, a wireless network, or the internet. The print job comprises job data as well as print data that are processed by the print controller 15. The print controller 15 processes the print data successively by means of a PDL module 16 for interpreting the print data, most often in the form of a page description language, such as PostScript, PCL, or any other suitable PDL, a RIP module 17 for generating a raster image in accordance with the print data, a RIE module 18 for enhancing a raster image and a halftone module 19 for converting a raster image into applicable density levels. After this processing, the print data are sent to a print engine 20 for generating print output according to the print job. The present invention is part of the RIE module 18.

The invention being thus described, it will be obvious that the same may be varied in many ways. Such variations are not to be regarded as a departure from the present invention, and all such modifications as would be obvious to one skilled in the art are intended to be included within the scope of the following claims.

What is claimed is:

1. A method for enhancing a raster image that comprises pixels, a pixel having a position in the raster image and a grayscale value, the method comprising the steps of:
   a) defining a second raster image of equal dimensions to said raster image;
   b) selecting a target pixel in the second raster image, having a target position;
   c) deriving a grayscale value for the target pixel from a grayscale value of a pixel in said raster image that is in a range of a pixel on a position corresponding to the target position, in order to disperse the grayscale value of a pixel in a predetermined range around its original position and to enhance the second raster image for further processing in a halftoning process without using pixel segmentation.

2. The method according to claim 1, wherein the pixel in said raster image is selected randomly within the range around the target position.

3. The method according to claim 2, wherein a high-pass filter is applied to enhance a contrast before dispersing a grayvalue.

4. The method according to claim 2, wherein the range around the target position is dependent on a grayscale value in said raster image.

5. The method according to claim 1, wherein a high-pass spatial filter in sequence with a low-pass spatial filter is used to disperse a grayscale value with sufficient contrast.

6. The method according to claim 1, wherein a morphological dilation operation is applied in addition to dispersing a pixel value.

7. The method according to claim 6, wherein the morphological dilation operation is dependent on the grayvalue of a pixel.

8. Print system comprising a print controller for receiving and converting print jobs into raster images, a print engine for marking image receiving material according to a binary image and an image processing module configured to process a grayscale raster image according to the method according to claim 1 and to process the resulting grayscale raster image into a binary image according to the halftoning process.

* * * * *